W. H. TOPHAM.

Spittoons.

Reissued July 29, 1873.

No. 5,514.

Wm H Topham
per James A Whitney
Attn

Witness
George J Barry
John Richter

UNITED STATES PATENT OFFICE.

WILLIAM H. TOPHAM, OF LONGMEADOW, MASSACHUSETTS.

IMPROVEMENT IN SPITTOONS.

Specification forming part of Letters Patent No. 106,094, dated August 2, 1870; reissue No. 5,511, dated July 29, 1873; application filed January 24, 1873.

*To all whom it may concern:*

Be it known that I, WILLIAM H. TOPHAM, formerly of the city, county, and State of New York, but now of the town of Longmeadow, in the county of Hampden and State of Massachusetts, have invented certain Improvements in Spittoons, &c., of which the following is a specification:

This invention is designed to be applied in the fabrication of spittoons, pails, or similar vessels, which ordinarily are liable to be overturned or displaced. The invention consists in forming the bottom or lower part of the vessel with a weight so arranged that, in case of the application of force in such manner as to tend to tilt or upset the vessel, the weight will resist such force to retain the vessel in an upright position, or to return it to such position in the event of its being overthrown; the said weight, also, causing the vessel to readily adjust itself to a proper bearing on the surface upon which it is placed.

Figure 1:
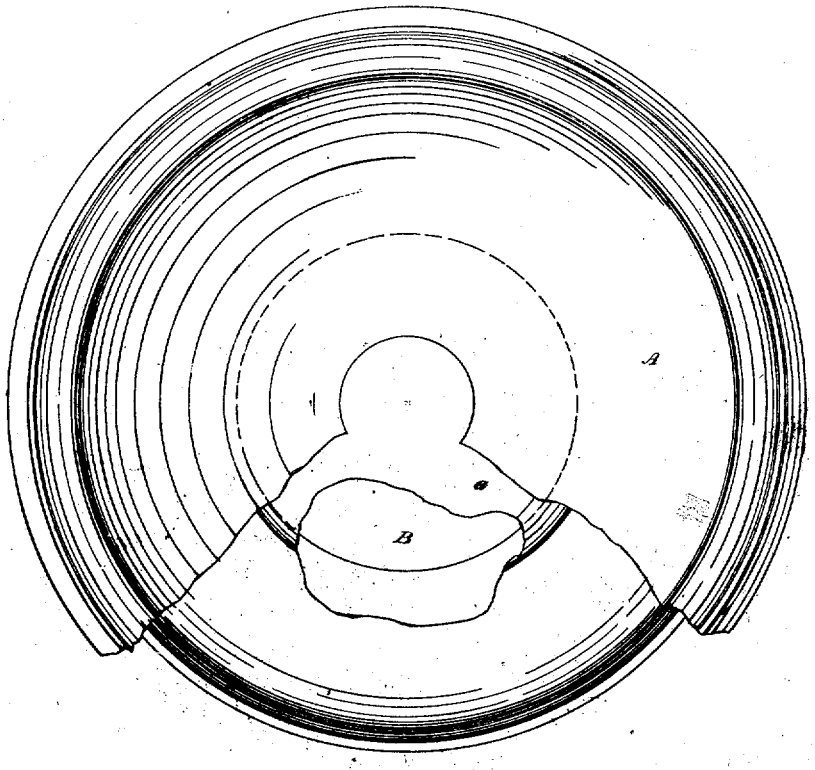
Figure 2:
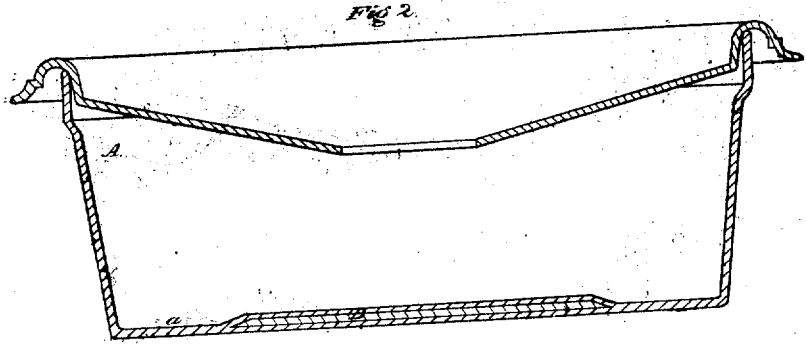

Figure 1 is a plan view of a spittoon made according to my invention, a portion being represented as broken away the better to show the arrangement of the weight in the base. Fig. 2 is a vertical transverse section of the same.

In the drawings, the spittoon, indicated at A, is shown as made of paper, the bottom *a* being provided with a weight, B, which should be concentric with the circumference of the said bottom, and which, in the example given, is disposed between the upper and lower of the two layers of material of which the bottom is composed.

This arrangement causes the weight to be fully protected, and also insures its retention in place without any special fastenings. By this provision of a weight in the base or bottom of the vessel the latter is made to possess all the advantages arising from being made of light material, together with the stability that otherwise could be secured only by making it of heavy material; and is made to adjust itself to a proper position in case of being carelessly thrown down, or of being pushed or tilted from any side.

The weight may be of any suitable substance, as, among others, the black oxide of manganese.

What I claim as my invention is—

1. A spittoon, or similar vessel, weighted at its bottom to insure its stability and enable it to right itself in case of being tilted, substantially as specified.

2. The arrangement of the weight between the two layers or thicknesses of material of which the bottom of the spittoon or similar vessel is composed, substantially as and for the purpose specified.

WM. H. TOPHAM.

Attest:

WM. S. GREENE,
P. C. SCHUYLER.